(12) United States Patent
Weekes et al.

(10) Patent No.: US 11,787,525 B2
(45) Date of Patent: Oct. 17, 2023

(54) RECONFIGURABLE HYBRID VTOL SYSTEM

(71) Applicant: ELROY AIR, INC., San Francisco, CA (US)

(72) Inventors: Terik Weekes, San Francisco, CA (US); Sean Belardo, San Francisco, CA (US); David Merrill, San Francisco, CA (US); Clint Cope, San Francisco, CA (US); Shane Hills, San Francisco, CA (US)

(73) Assignee: ELROY AIR, INC., San Francisco, CA (US)

( * ) Notice: Subject to any disclaimer, the term of this patent is extended or adjusted under 35 U.S.C. 154(b) by 304 days.

(21) Appl. No.: 17/070,170

(22) Filed: Oct. 14, 2020

(65) Prior Publication Data
US 2021/0107620 A1 Apr. 15, 2021

Related U.S. Application Data

(60) Provisional application No. 62/915,300, filed on Oct. 15, 2019.

(51) Int. Cl.
*B64C 1/30* (2006.01)
*B64C 29/00* (2006.01)
*B64C 3/56* (2006.01)
*B64C 39/02* (2023.01)
*B64U 80/70* (2023.01)

(52) U.S. Cl.
CPC .............. *B64C 1/30* (2013.01); *B64C 3/56* (2013.01); *B64C 29/0025* (2013.01); *B64C 39/024* (2013.01); *B64U 80/70* (2023.01)

(58) Field of Classification Search
CPC .... B64C 1/26; B64C 1/30; B64C 3/38; B64C 3/58; B64C 2201/102; B64C 2211/00; B64C 29/0016; B64C 29/290025
See application file for complete search history.

(56) References Cited

U.S. PATENT DOCUMENTS

| | | | | |
|---|---|---|---|---|
| 1,376,785 A | * | 5/1921 | Sellmer | B64C 3/56 244/49 |
| 3,966,142 A | * | 6/1976 | Corbett | B64C 29/0075 244/12.4 |
| 4,085,911 A | * | 4/1978 | Nahodyl | B64C 29/0075 244/12.4 |
| 4,132,374 A | * | 1/1979 | Abell | B64C 3/40 244/46 |
| 4,998,689 A | * | 3/1991 | Woodcock | B64C 3/40 244/3.28 |

(Continued)

*Primary Examiner* — Richard Green
*Assistant Examiner* — Arfan Y. Sinaki
(74) *Attorney, Agent, or Firm* — Martensen IP; Michael C. Martensen; Chad G. Clark

(57) ABSTRACT

A reconfigurable hybrid Vertical Takeoff and Landing (VTOL) vehicle includes a turntable bearing coupling a conventional wing to a fuselage. The fuselage, designed to couple to and release a cargo pod from its undercarriage, is configured to accept a high wing juncture such that the wing can rotate from a flight configuration to a transport configuration. The transport configuration aligns the wing with the fuselage sufficient to enable the hybrid VTOL vehicle to fit within a standard intermodal container or transport aircraft.

22 Claims, 13 Drawing Sheets

(56) References Cited

U.S. PATENT DOCUMENTS

| | | | |
|---|---|---|---|
| 5,337,974 A * | 8/1994 | Rumberger | B64C 3/56 |
| | | | 416/142 |
| 9,550,567 B1 | 1/2017 | Erdozain, Jr. et al. | |
| 2011/0036939 A1* | 2/2011 | Easter | B64C 37/02 |
| | | | 244/46 |
| 2016/0207625 A1 | 7/2016 | Judas | |
| 2018/0079484 A1* | 3/2018 | Ross | B64C 7/02 |
| 2018/0079485 A1* | 3/2018 | Kooiman | B64C 1/30 |
| 2018/0079486 A1* | 3/2018 | Kooiman | B64C 27/50 |
| 2022/0144421 A1* | 5/2022 | Rimanelli | B64D 27/24 |

\* cited by examiner

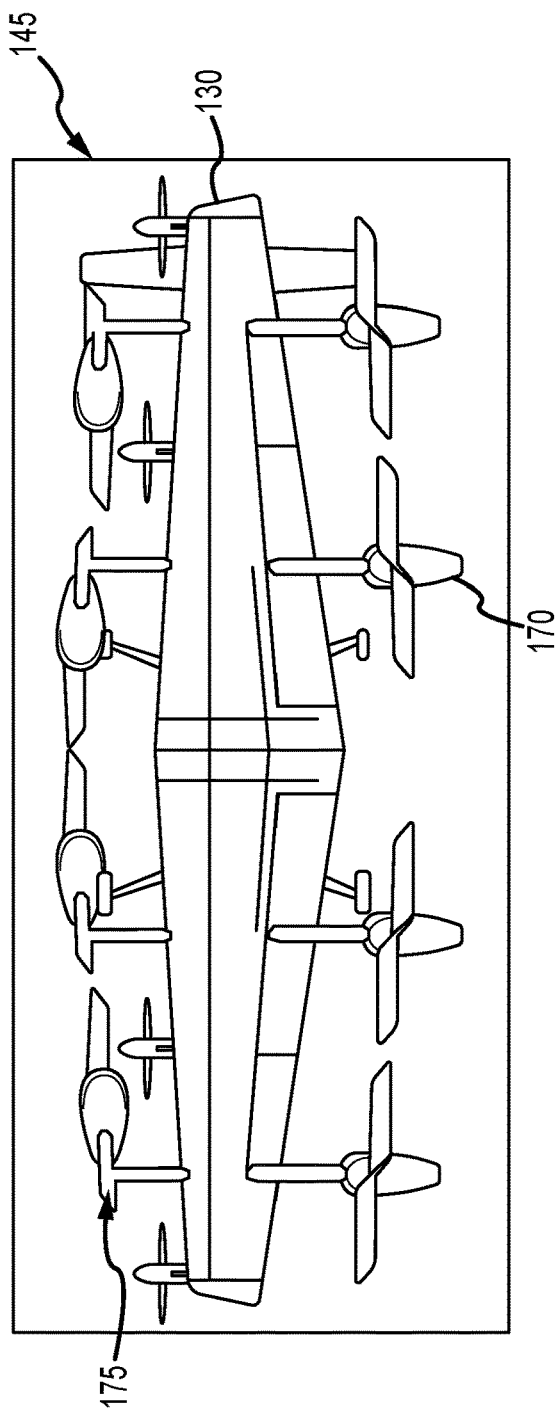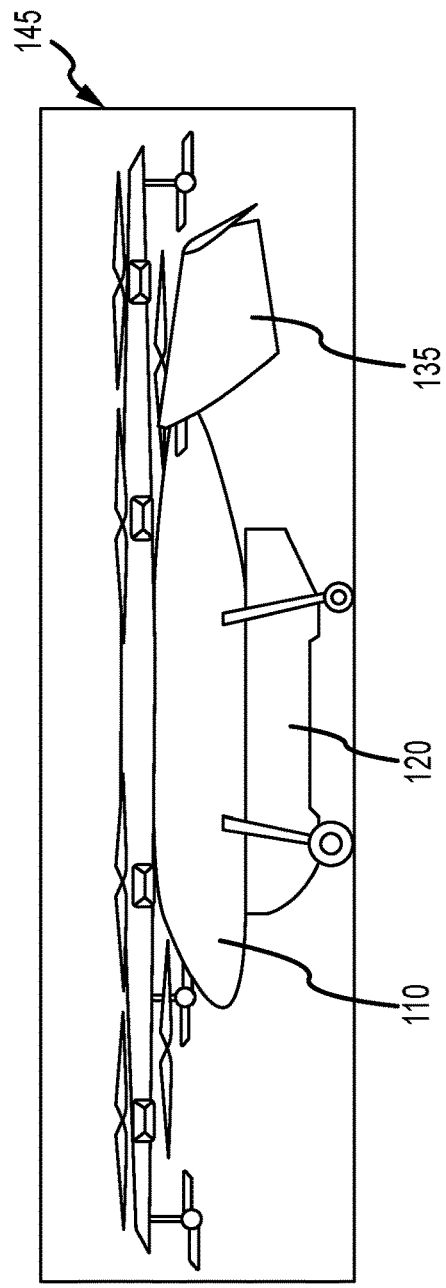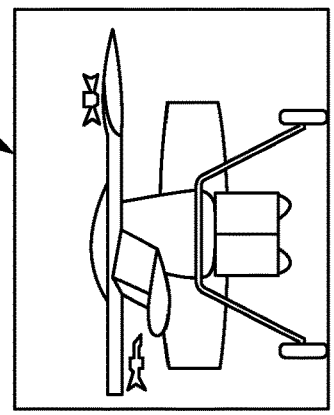
FIG.2B

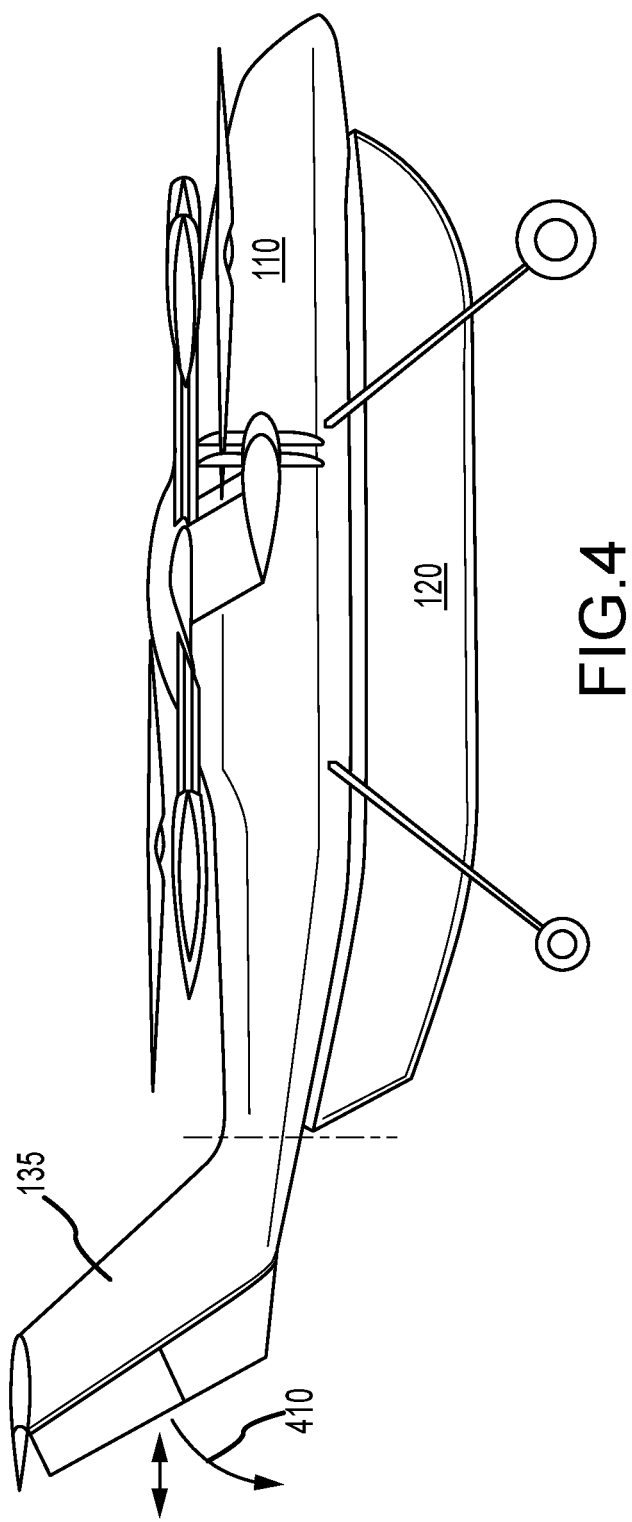

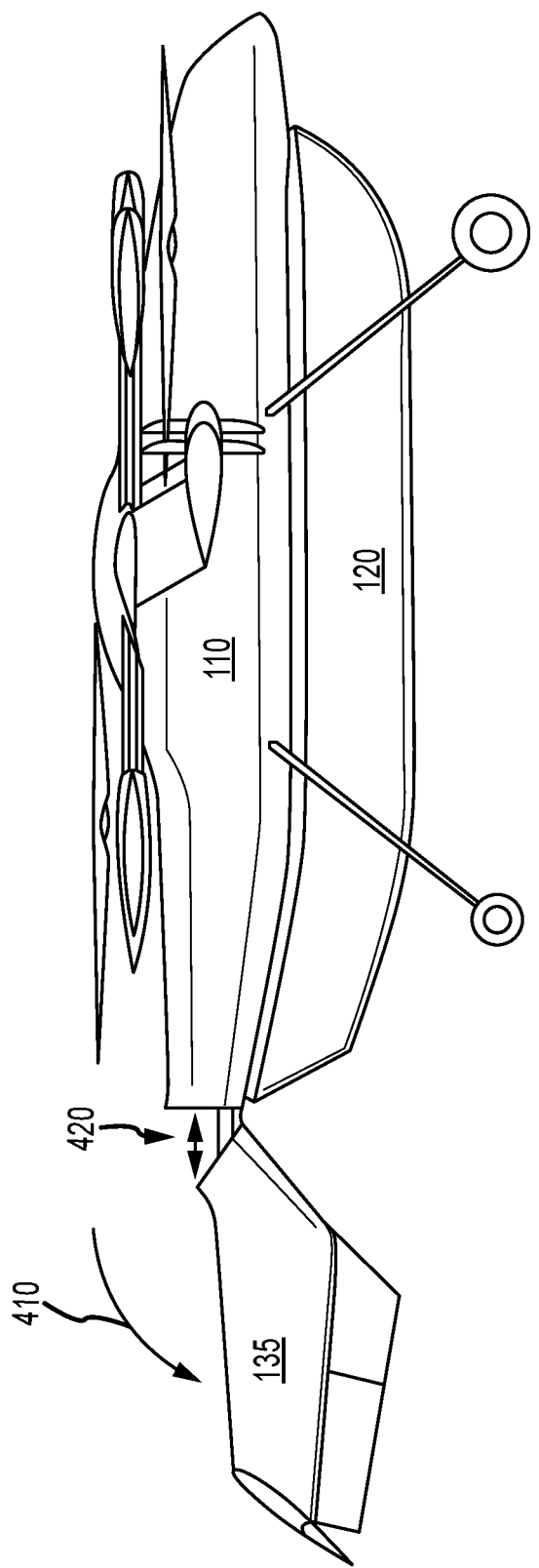

RECONFIGURABLE HYBRID VTOL SYSTEM

RELATED APPLICATION

The present application relates to and claims the benefit of priority to U.S. Provisional Patent Application No. 62/915,300 filed 15 Oct. 2019 which is hereby incorporated by reference in its entirety for all purposes as if fully set forth herein.

BACKGROUND OF THE INVENTION

Field of the Invention

Embodiments of the present invention relate, in general, to a hybrid Vertical Takeoff and Landing Vehicle (VTOL) and more particularly to a hybrid unmanned VTOL vehicle which can be collapsed for transportation and/or storage.

Relevant Background

Vertical Takeoff and Landing Vehicles (VTOL) come in a variety of sizes and shapes. Most are small crafts designed to capture images within a limited range, possess a small payload capability and are typically sold as consumer products. Commercial VTOLs used to survey power lines, buildings, in the production of movies and the like are larger and possess an increased lift capability but are power-hungry, inefficient and of limited range. Some of these crafts are modular to facilitate transportation and storage while others employ a variety of folding mechanisms to decrease their profile when not in a flight configuration.

VTOLs have limited range but their ability to operate independent of an airport, as with conventional aircraft, has made them widely appealing. A hybrid VTOL is a vehicle that possesses vertical takeoff and landing capabilities much like a VTOL but with the ability to transition to horizontal flight much like a conventional aircraft. Such hybrids capture the flexibility of a VTOL while combining it with the range and versatility of the conventional aircraft.

Hybrid VTOLs possess a lifting surface, wing, much like a conventional aircraft. As the hybrid gains horizontal speed the lifting surfaces of the craft supplement and, in some cases, surpass the thrust/lift requirements of the vertical rotors. As the hybrid travels from point A to point B it acts as a conventional aircraft only to transition back to its VTOL characteristics as its approaches the destination.

As with conventional aircraft transportation shipping a hybrid VTOL is a challenge. Shipping of conventional aircraft typically requires removal of certain structures (normally the wings) and then reassembly at the destination. A glider for example, is designed for that upon landing. In instances in which the footprint of the aircraft needs to be minimized for storage, yet an operational capability needs to be quickly regained, folding mechanisms are employed.

Mechanisms for folding wings and other structures to transport and store aircraft are well known. Naval aircraft employ a variety of techniques to reduce their footprint so they can be housed inside ships yet readily employed. A hybrid VTOL, however, presents some unique challenges. A hybrid VTOL includes two or more rotors for vertical lift during takeoff and landing operations and a conventional wing for horizontal lift during cruise operations. Combine this with a mission requirement to be lightweight yet have a large cargo capacity as compared to the overall weight of the craft, and options by which to configure the hybrid VTOL for transportation and storage, while making it readily available for mission operations, is a challenge. A need exists for a reconfigurable hybrid VTOL whereby the craft can be configured for a minimal footprint suitable for transportation and/or storage, yet quickly be reconfigured for flight operations while maintaining its high payload to weight characteristic. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A hybrid Vertical Takeoff and Landing (VTOL) vehicle is quickly and efficiently reconfigurable from a flight configuration to one which can be transported inside a cargo aircraft or intermodal container. The hybrid VTOL vehicle includes a fuselage, defining a longitudinal, lateral and vertical axis, having a turntable bearing coupling the fuselage in a horizontal plane to a wing. The wing includes two or more rotor assemblies for vertical flight coupled to the wing symmetrically distant from the fuselage and a wing midpoint. The wing is coupled to the fuselage at this midpoint along a wing lateral axis of rotation. The wing further includes a unitary and continuous wing spar throughout the wingspan which is coupled to the fuselage for flight operations but at the wing lateral axis of rotation and at the midpoint of the wing for rotation on turntable bearing to be place in a transport configuration.

Other features of the present invention include that the longitudinal axis of the fuselage bisects the turntable bearing and the wing lateral axis of rotation is aft of the main spar. A plurality of shear pins attaches the wing spar to the fuselage in a flight configuration in which aerodynamic flight loads are transferred from the wing spar to the fuselage via the shear pins independent of the turntable bearing.

The reconfigurable hybrid VTOL vehicle also includes an empennage that is configured to translate away from the fuselage along the longitudinal axis and pivot downward in a vertical plane defined by the vertical and longitudinal axis so as to deconflict with the wing in the transport configuration. The wing of the reconfigurable hybrid VTOL vehicle is sufficiently rigid to prevent aeroelastic deformation caused by the two or more rotor assemblies and each rotor assembly, in one embodiment, pivotally rotates toward the wing lateral axis of rotation to achieve a transport configuration.

To transition the reconfigurable hybrid VTOL vehicle from vertical flight operations to horizontal operations one or more sources of horizontal thrust are coupled to the wing. The sources of horizontal thrust, as well as well as the rotor assemblies, are controlled by a central control module 190 which includes a central wiring bus 195 extending through the turntable bearing electrically coupling each of the rotor assemblies and horizontal thrust source to the central control module.

In the transport configuration the reconfigurable hybrid VTOL vehicle possess exterior dimensions less than interior dimensions of an intermodal container. Indeed, the dimensions of the reconfigurable hybrid VTOL in the transport configuration are less than or equal to 7 feet 6 inches wide, 7 feet 6 inches high, and 39 feet 0 inches long.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIGS. 2A and 2B show one embodiment of a reconfigurable hybrid VTOL of the present invention in a transport configuration as would be positioned within a shipping container;

FIG. 4 is a side view a reconfigurable hybrid VTOL, in flight configuration, according to one embodiment of the present invention;

FIGS. 5A and 5B are side views of the reconfigurable hybrid VTOL of FIG. 3 illustrating the motion and position of the empennage for reconfiguration to the transport configuration;

Figure 1:
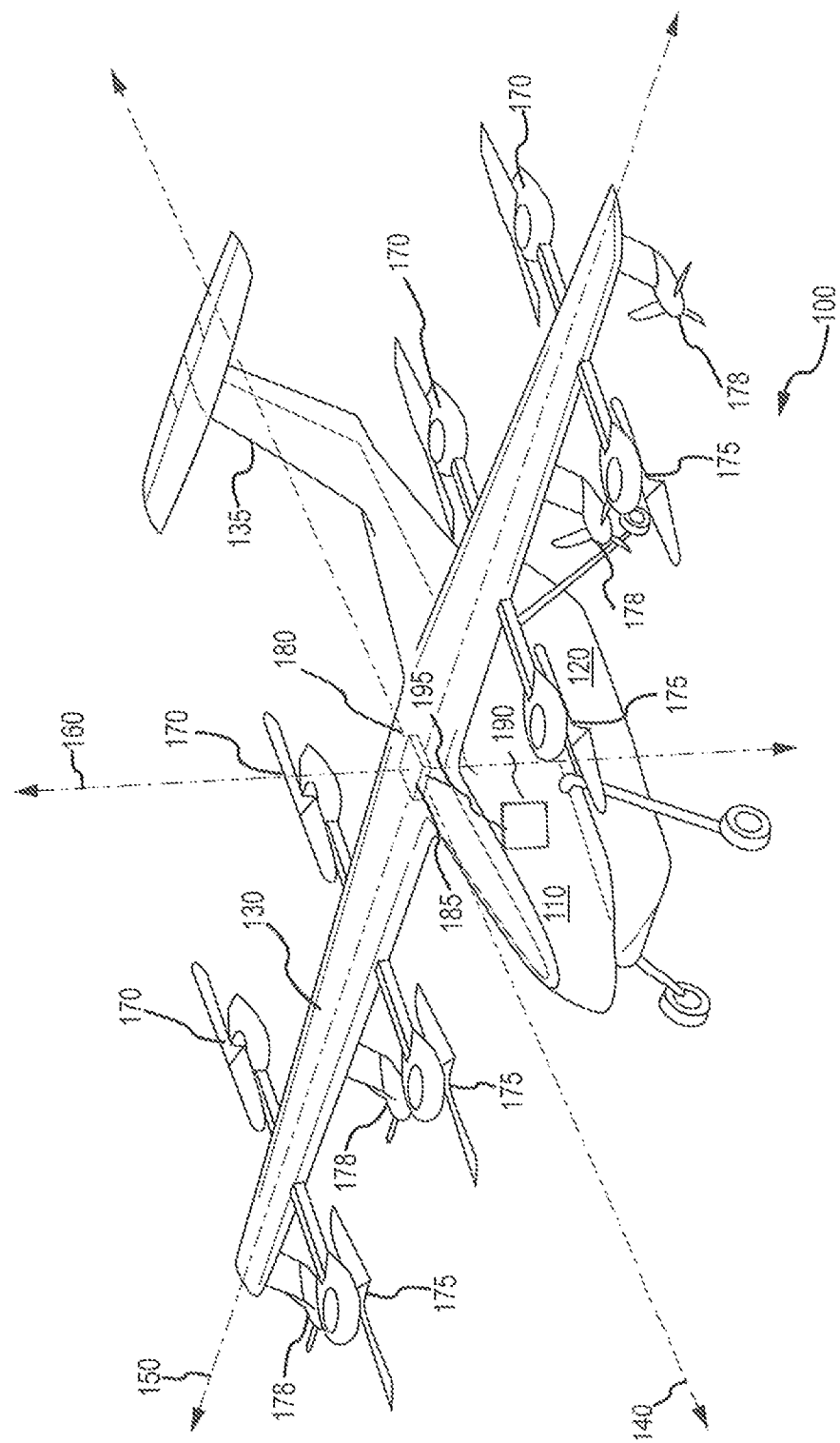
FIG. 1 is a perspective view of a reconfigurable hybrid VTOL, in flight configuration, according to one embodiment of the present invention.

The Figures depict embodiments of the present invention for purposes of illustration only. Moreover, like numbers refer to like elements throughout. In the figures, the sizes of certain lines, layers, components, elements or features may be exaggerated for clarity. One skilled in the art will readily recognize from the following discussion that alternative embodiments of the structures and methods illustrated herein may be employed without departing from the principles of the invention described herein.

DESCRIPTION OF THE INVENTION

A reconfigurable hybrid Vertical Takeoff and Landing (VTOL) vehicle includes a turntable bearing coupling a conventional wing to a fuselage. The fuselage, designed to couple to and release a cargo pod from its undercarriage, is configured to accept a high wing juncture such that the wing can rotate from a flight configuration to a transport configuration. The transport configuration aligns the wing with the fuselage sufficient to enable the hybrid VTOL vehicle to fit within a standard intermodal container or transport aircraft.

Rotors, symmetrically positioned on wing but apart from a wing lateral axis of rotation, selectively pivot toward the wing lateral axis to reduce the width of the wing. To permit the wing to align with the fuselage in the transport configuration, the empennage of the hybrid VTOL vehicle extends aft from the fuselage and pivots downward providing clearance for rotors and the wing.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. Terms such as those defined in commonly used dictionaries, should be interpreted as having a meaning that is consistent with their meaning in the context of the specification and relevant art and should not be interpreted in an idealized or overly formal sense unless expressly so defined herein below. Well-known functions or constructions may not be described in detail for brevity and/or clarity.

The term aeroelasticity is understood to mean the branch of physics and engineering studying the interactions between the inertial, elastic, and aerodynamic forces occurring while an elastic body is exposed to a fluid flow. The study of aeroelasticity may be broadly classified into two fields: static aeroelasticity dealing with the static or steady state response of an elastic body to a fluid flow; and dynamic aeroelasticity dealing with the body's dynamic (typically vibrational) response.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

An exemplary embodiment of the reconfigurable VTOL vehicle of present invention is shown in FIG. 1. In such an embodiment the fuselage 110 of the hybrid VTOL vehicle 100 has a length determined by the internal systems, propulsion requirements and the cargo pod 120 coupled to the undercarriage. In one embodiment of the present invention the length of the fuselage 110 is equal to or less than the maximum length of a wing 130 but no longer than the maximum length of an intermodal container.

For purposes of the present invention the hybrid VTOL vehicle of the present invention is associate an orthogonal Cartesian coordinate system in which the centerline of the fuselage 110 is aligned a longitudinal axis 140 and, in the flight configuration, the wing 130, from wingtip to wingtip, is aligned with a lateral axis 150 which is perpendicular to the longitudinal axis 140. A vertical axis 160, extending through the aircraft upward and toward the ground (when the aircraft is in rest on the ground) is orthogonal to both the later axis 150 and the longitudinal axis 140. As discussed in more detail below, the center of mass of the wing is focused on a wing lateral axis of rotation 610, which, in a flight configuration, is coincident with the lateral axis 150, and in transport configuration with the longitudinal axis 140.

As shown in FIG. 2, the wing 130 in the stowed (transport) position is longitudinally aligned with the fuselage 110 centerline. FIG. 1 shows the air vehicle 100 with the wing 130 in the deployed position (flight configuration) substantially perpendicular to the fuselage 110. As shown for the embodiment in FIGS. 1 and 2, the wing 130 is symmetrical with respect to the fuselage thereby providing simplicity in aerodynamic design. One of reasonable skill in the art will recognize that the wing may take a variety of shapes depending on the aerodynamic needs of the vehicle without departing from the scope of the present invention.

Figure 3:
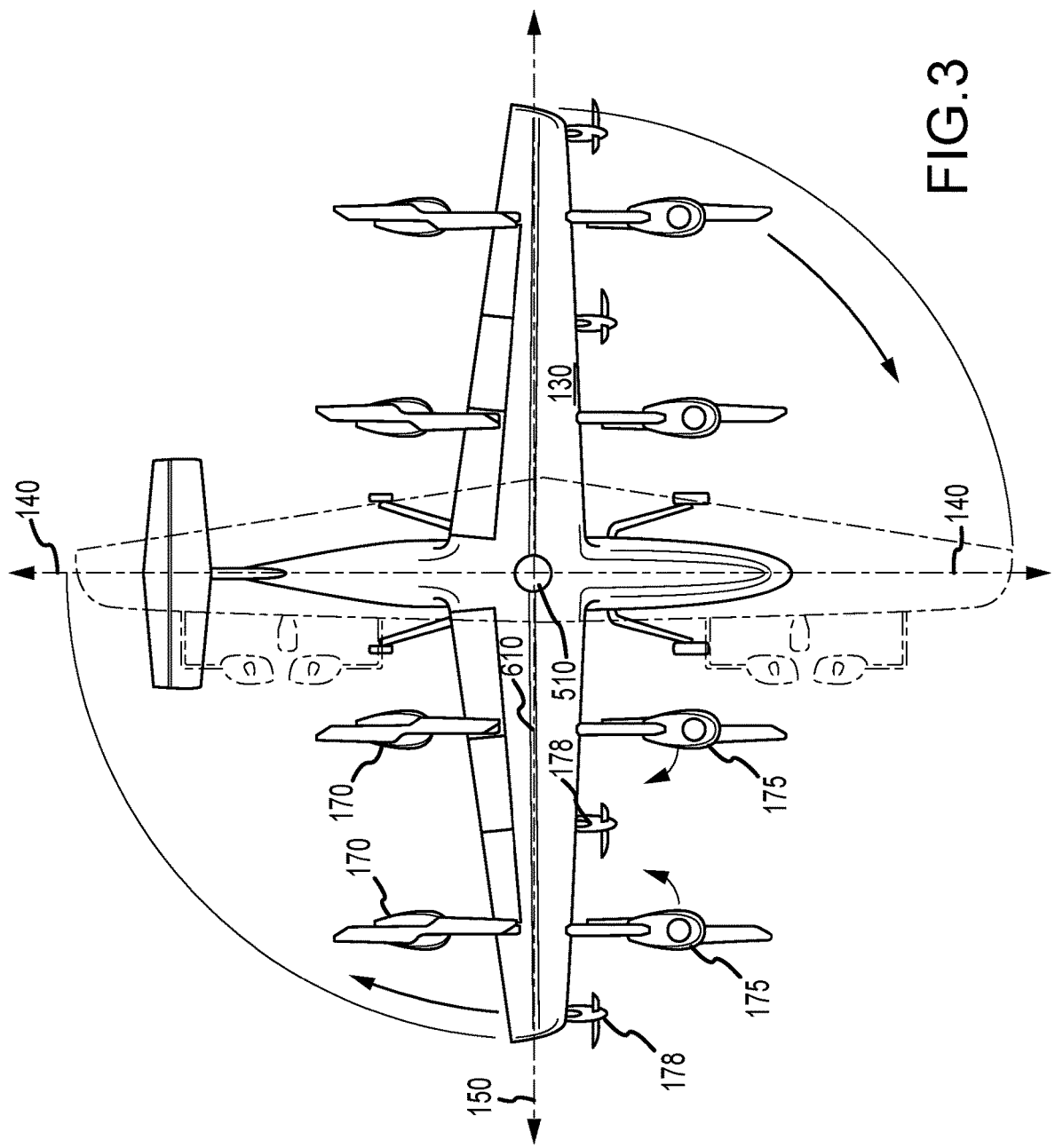
FIG. 3 is a top view of a reconfigurable hybrid VTOL according to the present invention.
Figure 6:
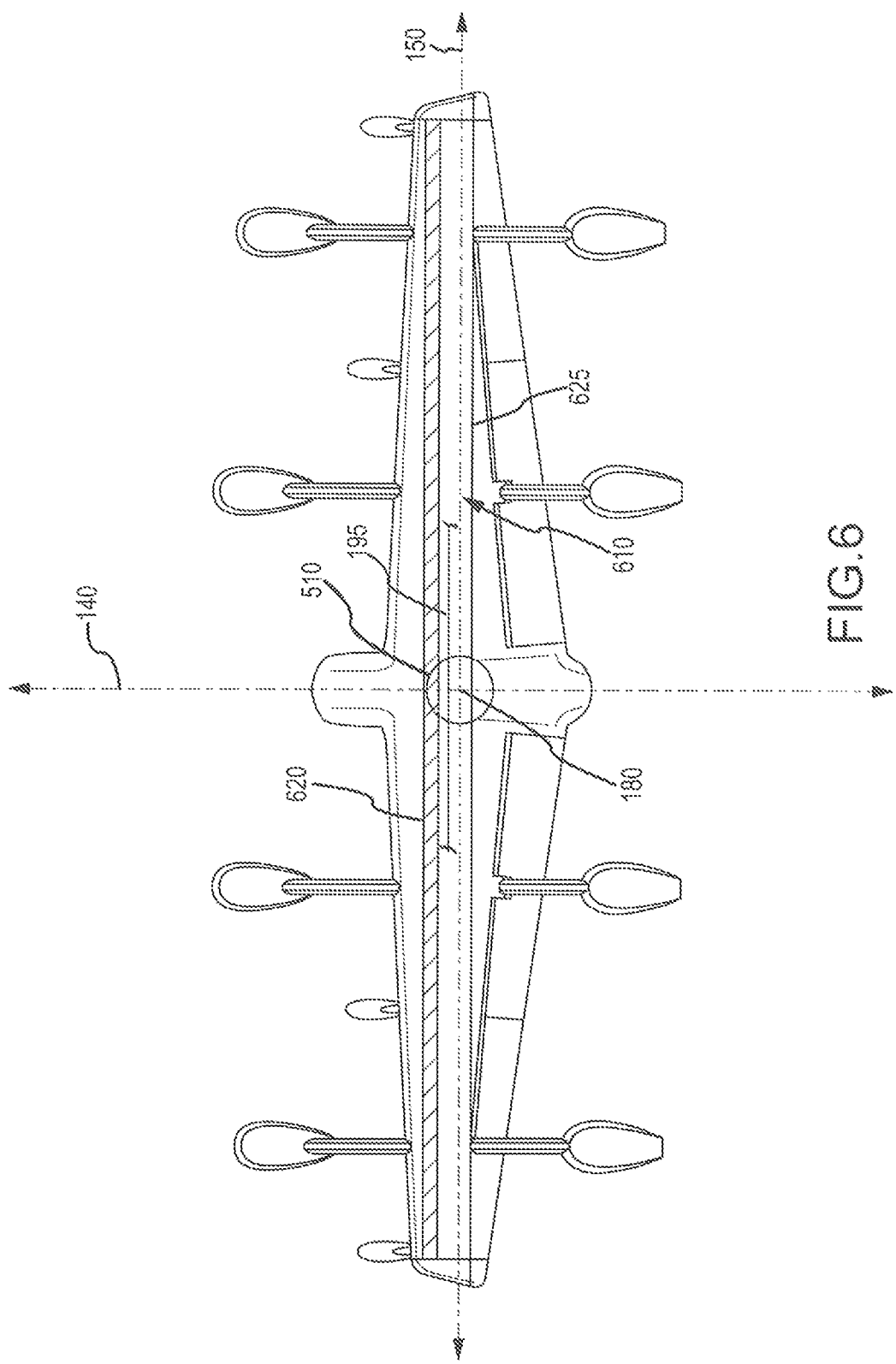
FIG. 6 is a top view of a wing suitable for use with one embodiment a reconfigurable hybrid VTOL of the present invention.

With additional reference to FIGS. 3 and 6, to reconfigure the wing 130 between the deployed flight configuration and the transport configuration, a turntable (slew) bearing 510 is positioned at the fuselage centerline 140 and coupled to the midpoint of the wing 180 along the wing lateral axis of rotation 610, aft of the main wing spar 620. In one embodiment of the present invention the bearing fits between the wing forward spar and the aft fuel tank bulkhead in order to avoid interrupting critical structure. The selection of a slew turntable bearing as the pivot mechanism also provides a pass-through in the center of the bearing for wire routing. Fitting a bearing within the constraints of the forward spar and the aft fuel tank bulkhead places the wing pivot axis at a 40% chord. In order to reduce the complexity of the supporting structure and to reduce the complexity of the wing-to-fuselage part break, the wing pivot axis is purely vertical, such that the wing rotates in the x-y plane.

Wiring harnesses, cables and the like 195 necessary for control and operations of the wing flight surfaces and each rotor assembly traverses, in one embodiment, the turntable bearing. By traversing the bearing minimal excess wiring or cables are require accommodating the repositioning the wing from flight to transport configurations. In other embodiments the wires and cables may rest outside the turntable bearing with sufficient length of the wires and cables provided to ensure that upon rotation of the wing the wires/cables are not impeded, crimped or broken.

The wing lateral axis of rotation of the hybrid VTOL vehicle, in its flight or deployed configuration is aligned with and defines the aircraft lateral axis 150. As previously mentioned, the axis system of the present invention is defined using the intersection of the fuselage 110 and the wing 130 as the origin 185. The longitudinal axis 140 extends along the length of the fuselage 110, forward and aft, and a lateral axis 150 extends along the span of the wing 130, left and right aligned with the wing lateral axis of rotation. A vertical axis 160, orthogonal to the lateral and longitudinal axis, extends from the origin upward and downward from the point of view of the aircraft as it rests on the ground. The origin 185 of the lateral 150, longitudinal 140 and vertical 160 axis is placed at the center of the turntable bearing 510.

The high wing nature of the wing allows the rotor motors to clear the nose section of the fuselage of the aircraft. The tail or empennage, however, presents an obstacle. The hybrid VTOL of the present invention is optimized to carry a cargo pod attached to its undercarriage. To provide adequate control surface authority in in a horizontal flight mode and so as to deconflict with any ground operations involving the cargo pod, the hybrid VTOL vehicle of the present invention uses a high T-Tail configuration. The position of the T-Tail is such that upon rotation of the wing to a transportable configuration the wing and the tail conflict as well as keeping the tail outside of the wake of the wing and rotors during low speed operations.

To enable the wing 130 to rotate and align with the wing lateral axis of rotation 610 as well as fit within the space available of a rear loading ramp (when lowered) of a cargo aircraft such as a C130, the empennage 135 of the aircraft extends aft and pivots downward. As seen in FIGS. 4, and 5A, this aft and downward motion provides room sufficient for the wing lateral axis of rotation 610 to align with the longitudinal axis 140 and for overall height of the hybrid VTOL vehicle to be decreased. The empennage 135 is communicatively attached to the fuselage 110 using one or more extension tubes (or the like) and a plurality of latches. Upon release of the latches, the empennage 135 can extend 420 or translate aft. Upon reaching a predetermined degree of extension, the empennage 135 pivots 410 downward.

As the hybrid VTOL vehicle of the present invention is optimized toward a goal of maximum cargo pod load capacity, the singular movement of the empennage is comparable to multiple the mechanisms employed to fold the rotor extension arms. In consideration of a plurality of the necessary mechanisms to fold the rotor extension arms a singular extension and pivot mechanism of the empennage produces an overall weight savings that can be realized in the cargo carrying capacity.

Figure 5B:
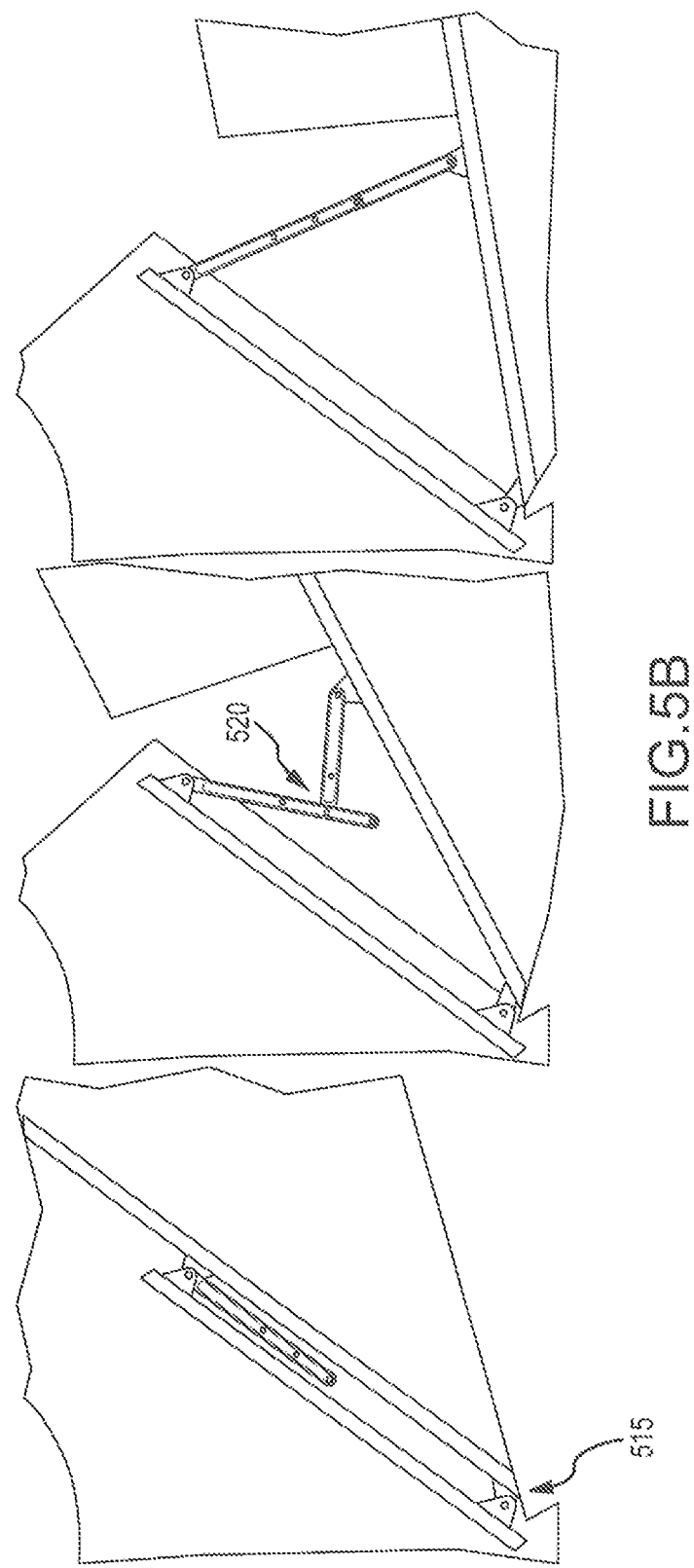

In another embodiment the requirement to stow the hybrid VTOL aircraft without the need for hand tools drove uses the already existing aft fuselage bulkhead and vertical tail front spar. By having a fixed hinge point 515 towards the belly of the aircraft as shown in FIG. 5B, and a folding linkage 520 at the top of the bulkhead, a user can pull a pin, lower the tail, and re-pin the extended linkage to lock the vertical tail in the stowed position. This approach includes a small access hatch on either side of the aircraft to provide access to the locking pins in the linkage.

The wing 130 of the hybrid VTOL vehicle includes a main wing spar 620 configured to convey aerodynamic loading (forces) to the fuselage 110 during flight operations as shown in FIG. 6. The wing spar is removably coupled to the fuselage by a plurality of pins 710 in the flight configuration. These pins 710 transfer flight loads between the wing 130 and the fuselage 110 independent of the turntable bearing 510.

During ground operations, the weight of the wing 130 and any rotors 170, 175 and motors 178 attached to the wing are centered along the lateral axis of rotation. The wing lateral axis of rotation 610 is centered on the turntable bearing 510 at the wing midpoint 180. Upon release of the wing spar pins 710, the wing 130 can freely rotate within a plane defined by the lateral 150 and longitudinal 140 axis.

The hybrid VTOL of the present invention further combines two or more rotors assemblies 170, 175 for vertical operations with the conventional lifting surface of the wing 130 for horizontal flight conditions. The hybrid nature of the VTOL vehicle places, in one embodiment, eight rotor assemblies 170, 175 symmetrically distant from the fuselage 110 on the wing 130. One of reasonable skill in the relevant art will appreciate that the number of rotor assemblies 170, 175 may vary, and such variants of the present invention are contemplated.

Each rotor assembly 170, 175 is positioned apart from a fuselage centerline 140 and apart from a wing centerline 610. The wing 130, in one embodiment of the present invention, is a conventional upswept high mounted wing with varied camber and chord characteristics. While not a focus of the present invention, one of reasonable skill in the relevant art will recognize that the aerodynamic features of the wing my vary and be optimized for aircraft performance in a different conditions and mission requirements.

The wing 130 includes a wingspan as defined as a line extending from one wingtip to the other wingtip. The lateral axis 150 the aircraft, in this embodiment, coincides with a wing lateral axis of rotation 610 in the flight configuration. The wing lateral axis of rotation 610 represents an axis on which the wing and rotor assembly combinations would balance and rotate freely. As illustrated in FIG. 6, the wing lateral axis of rotation 610 may or may not align with a line extending between each wingtip.

To provide adequate clearance for rotor operations and so that thrust generated by each rotor is not impeded by the wing, each rotor assembly 170, 175 is displaced from the wing 130 parallel to the longitudinal axis and perpendicular to the wing lateral axis. In the version of the present invention shown in FIG. 1 four rotor assemblies 175 are positioned forward of the wing and four rotor assemblies 170 are positioned aft of the wing, symmetrically positioned from the fuselage when in a flight configuration.

To enhance control during the transition from vertical to horizontal flight, the rotor assemblies 175 in front of the leading edge of the wing are inverted with the rotor blades operating below the bottom surface of the wing 130. Conversely the rotors of rotor assemblies aft of the trailing edge of the wing 170 operate above the upper surface of the wing 130. Each rotor produces a substantial vertical thrust component and each rotor blade path is apart from the wing so that during vertical operations the wing does not impede or interfere with the vertical thrust produced by each rotor. As the hybrid VTOL vehicle of the present invention gains forward velocity due to thrust from its horizontal motor 178, the air displaced by each rotor moves aft with respect to the aircraft and more importantly, the wing 130. To prevent downwash from the rotors forward of the wing 130 from negatively impacting the performance of the wing during the transitionary flight mode of operations the rotors forward of the wing 175 operate below the wing.

Each rotor assembly 170, 175, when creating vertical thrust, produces a twisting moment both in a plane defined by the lateral and vertical axis as well as the plane defined by the longitudinal and the vertical axis. The aeroelasticity of the wing is correspondingly designed to accept these moments without detrimentally impacting its ability to provide a lifting force during horizontal flight operations and, more importantly, during the transition from vertical to horizontal flight operations and vice versa.

Aeroelasticity is the branch of physics and engineering studying the interactions between the inertial, elastic, and aerodynamic forces occurring while an elastic body is exposed to a fluid flow. The study of aeroelasticity may be broadly classified into two fields: static aeroelasticity dealing with the static or steady state response of an elastic body to a fluid flow; and dynamic aeroelasticity dealing with the body's dynamic (typically vibrational) response.

Aircraft are prone to aeroelastic effects because of the need to be lightweight and withstand large aerodynamic loads. The present invention is designed to avoid the following aeroelastic problems including divergence where the aerodynamic forces increase the angle of attack of a wing which further increases the force. The wing is also designed to circumvent control reversal where control activation produces an opposite aerodynamic moment that reduces, or in extreme cases, reverses the control effectiveness. Finally, the wing of the present invention is designed so as to not experience unwanted flutter which is the uncontained vibration that can lead to the destruction of an aircraft. These aeroelasticity problems are prevented by adjusting the mass, stiffness and aerodynamics of the wing and rotor assembly structures.

Aeroelastic effects are routinely investigated and controlled in any aircraft design process. Two requirements of the present invention drive the design and construction of the wing. The wing of the present invention must be sufficiently rigid to sustain and transfer the vertical lift forces of each rotor assembly. Horizontal flight operations in which the wing is the primary source of lift and vertical operations in which the rotor assembles are the primary source of life are not exclusive. There are several conditions in which both the wing and the rotor assemblies will work together to provide lift for the hybrid VTOL vehicle of the present invention. Thus, the twisting and other aeroelastic effects of the moments and other flight loads drive the wing design.

Weight is a primary design consideration of the present invention. The present invention provides a platform to transport and deliver a payload via a cargo pod 120. While in all aircraft weight is a consideration, weight is a significant consideration in the aircraft structure of the present invention as any additional weight imparted in the wing 130 or fuselage 110 removes a corresponding amount of available payload for the same lifting forces.

To support the moments (torsional forces) produced by each rotor 170, 175, the wing 130 must be sufficiently rigid. The rigidity of the wing drives a unitary/continuous wing spar 620 spanning from one wingtip to the other and a secondary continuous wing spar 625 aft of the main wing spar and aft of the lateral wing axis of rotation 610. While other designs can break the wing spar 610 using hinges and the like to fold the wing into a transportable configuration, such an approach, considering the need to maintain a stiff wing to support the rotors, would require a considerable wing structure to support strong hinges, all at the cost reduced available cargo weight.

The entire hybrid VTOL vehicle of the present invention is reconfigurable to a transport configuration. One embodiment of the present invention enables the footprint of the hybrid VTOL vehicle to be minimized so as to be transportable on a cargo aircraft, ship or intermodal container. These combinations of requirements drive the design to a unique and optimal configuration. This optimal configuration includes a requirement for a continuous, unitary wing spar.

The wing spar and the wing lateral axis of rotation, in one embodiment of the present invention, are not collinear. The design of the wing and wing spar is contingent on flight operations including considerations for both vertical flight whereby the plurality of rotors produce vertical forces sufficient for flight operations and horizontal fight in which the rotors are stowed/locked and the lift from the wing is produced by differential pressure on the upper and lower surfaces of the wing.

Figure 7:
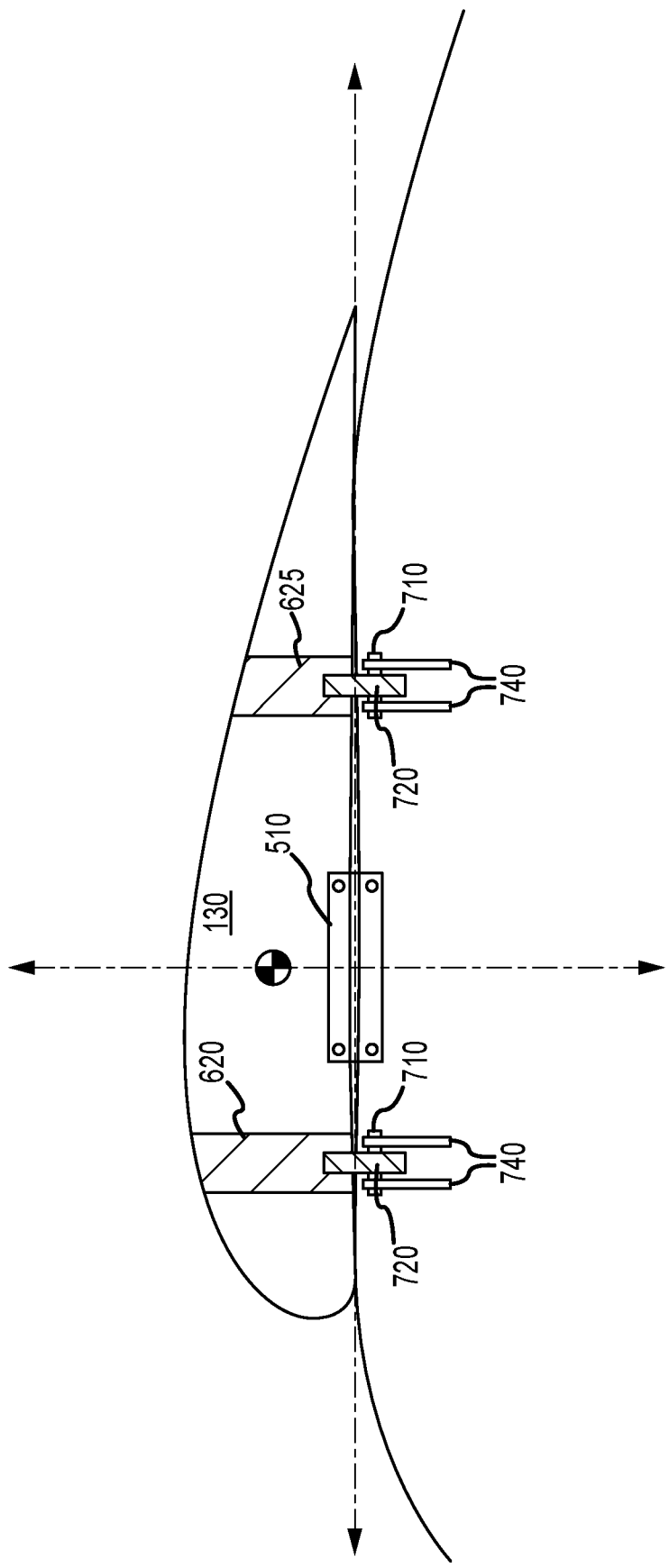
FIG. 7 is a side cut away view of a wing suitable for use with one embodiment a reconfigurable hybrid VTOL of the present invention.

With reference to FIGS. 6 and 7, the turntable bearing 510 rotatably couples the wing 130 to the fuselage. The turntable bearing 510 does not, in one embodiment of the present invention, convey aerodynamic forces from the wing 130 to the fuselage 110 during flight operations. To do so the bearing would require a robust construction and mounting structure. The cost of such a robust construction and mounting structure is weight, and such weight is detrimental to the cargo carrying capacity of the hybrid VTOL vehicle. Accordingly, the rotatable bearing 510 is configured to solely support the static weight of the wing. And as the static weight of the wing is centered on the wing lateral axis of rotation 610, the turntable bearing 510 is bisected by that axis and positioned at the axis midpoint.

In the embodiment of the present invention shown in FIG. 7, the wing rotational mechanism comprises a turntable bearing 510, four locking extensions 720 (two are shown), and their corresponding four locking pins 710 (two are shown). The extensions 720 and corresponding pins 710 are located at each of the four corners where the spars 620, 625 intersection and overlap the fuselage 110. As the wing 130 swings into its flight configuration the extensions 720 engage the fuselage fittings 740. With each extension 720 positioned within each fitting 740 a shear pin 710 couples the extension 720 to the fitting 740 thereby joining the wing 130 to the fuselage 110. When these locking pins 710 are removed from all four locking extensions 720, the wing is able to rotate. The present invention includes multiple redundant locking pins and corresponding locking holes (not shown) to prevent unintended pin 710 removal and ensure the safety of the hybrid VTOL vehicle by preventing accidental wing rotation.

The turntable bearing 510 is located below and in the widthwise center of wing aligned with the wing lateral axis of rotation 610, at the top of fuselage 110 and is between the two spars 620, 625. During wing rotation, the turntable bearing 510 supports the weight of wing 130 and enables the wing to rotate freely.

As the wing 130 rotates to a transportable configuration the rotor assemblies 175 forward of the leading edge of the wing pivot or fold toward the wing 130 in plane with the wing rotation. This configuration provides the greatest symmetry in folding of the rotor assemblies, where all four of the forward rotor assemblies are swung as opposed to some asymmetric set of forward and aft assemblies required for a wing that swings some partial amount in order to fit within the constrained stowage space. Additional symmetry can be allotted to the lockout configuration and loads when stowed. Meaning, loads remain orthogonal to the structure in a 90-degree configuration.

With the wing stowed, the front rotor assemblies fold to meet the space requirements. The break location for the fold is based on volumetric constraints using a plurality of folding mechanisms as would be known to one of reasonable skill in the relevant art. The selection is based on a balance of weight, stiffness, rotation amount, usability and the amount of external protrusions.

In other embodiments the rotor assemblies may fold downward in the vertical plane. In another embodiment of the present invention the aft rotors 170 are fixed with respect to their orientation with the wing. In other embodiments of the present invention, they too can pivot toward the wing or downward to minimize the hybrid VTOL vehicle's transportation configuration footprint. The hybrid VTOL vehicle of the present invention also includes, in one embodiment, horizontal propulsion devices (motors) 178 coupled to the wing. As with the rotor assemblies 175 forward of the leading edge, they too can fold toward the wing in the transportable configuration.

Figure 2A:
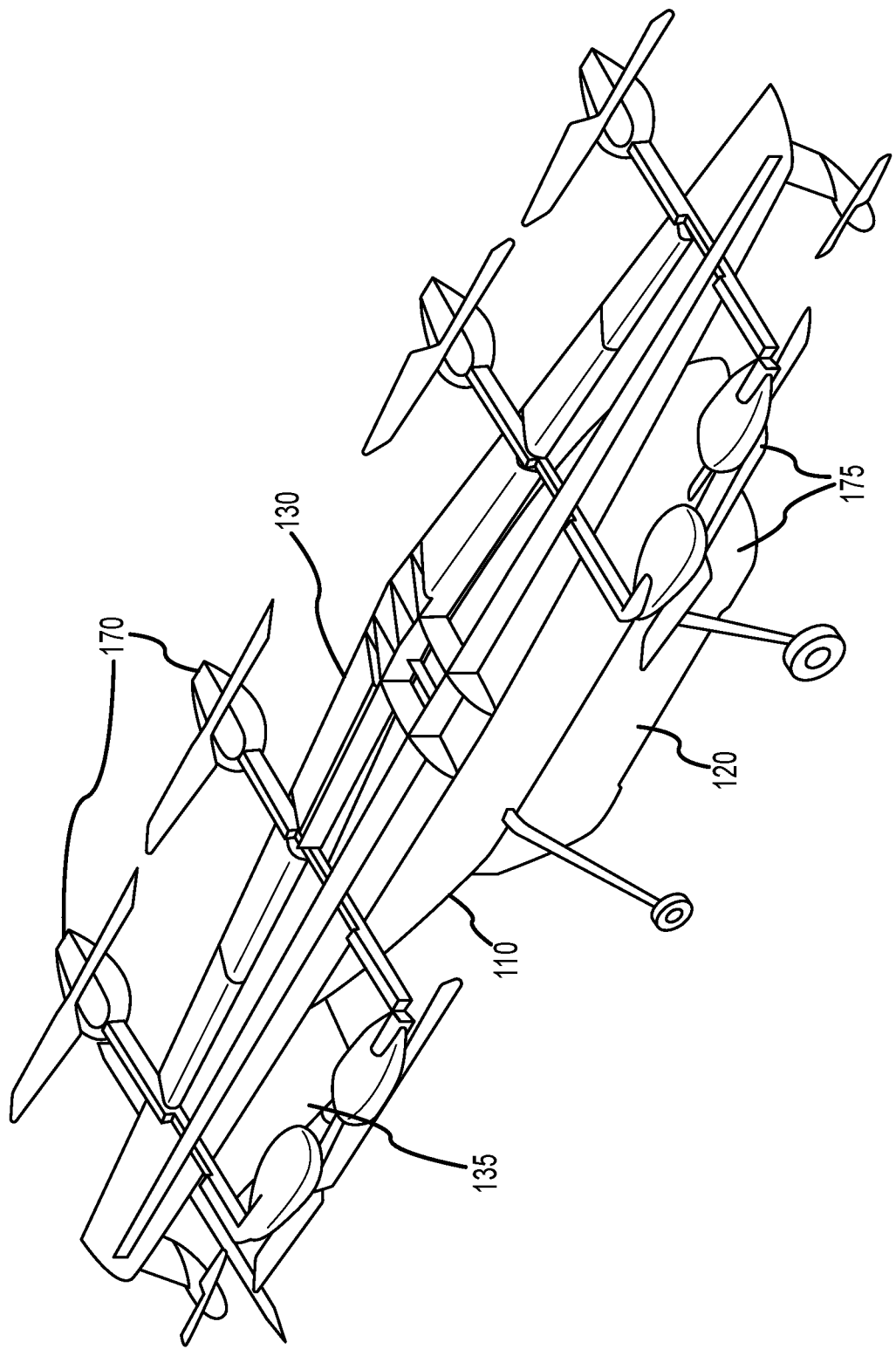

FIGS. 2A and 2B shows wing fully rotated. In this position, in this embodiment, wingtips are aligned with the fuselage 110 and the longitudinal axis 140 and four of the eight rotors are folded 90 degrees toward the leading edge of the wing. In this fully folded position, conventional model hybrid VTOL vehicle is less than 39 feet long, 7 feet 6 inches wide, and 7 feet 6 inches high. These various combinations of folding enable the hybrid VTOL vehicle to fit into standard cavities 145 such as intermodal containers, and the fuselage of military aircraft such as a C130, C120 and the like. For reference the interior dimensions of a 40-foot ISO 6346 container are (L×W×H) 39.42'×7.83'×7.75' (12.01 m×2.38 m×2.36 m) with a door opening (W×H) of 7.75'×7.5' (2.36 m×2.28 m). Similarly, a C-130 aircraft cargo hold possesses the dimensions of (L×W×H) 41'×10'×9' (12.49 m×3.04 m×2.74 m). The aircraft further requires a 17 deg approach and departure angle with vehicle in stowed configuration.

In another embodiment of the present invention (not shown) the lengthwise fuselage longitudinal line is not substantially parallel with the wing lateral axis of rotation when the wing is fully rotated. Instead, there exists an offset angle between these two lines, this angle being created by the turntable bearing. This offset angle causes wing to tilt downwards toward the front of hybrid VTOL vehicle and thereby, with wing tips, avoid hitting the T-tail when placed in the transportation configuration.

An objective of the present invention is to enable a hybrid VTOL vehicle to be reconfigured for transportation. The transport configuration, in one embodiment of the preset invention, enables the hybrid VTOL vehicle of the present invention to fit within a conventional intermodal container or similar constrained space for transport. Intermodal containers vary slightly in size, but their interior volumetric dimensions are at a minimum 7 feet 8 inches wide, 7 feet 5 inches high and 19 feet 3 inches long. Similarly, the hybrid VTOL vehicle of the present invention, when in its transportation configuration, can easily fit within a C-130 or similar cargo aircraft. The nominal size of the cargo bay of a C-130 is 41 feet long, 9 feet high and 10 feet wide.

The transport configuration of the hybrid VTOL vehicle of the present invention enables a conventional sized aircraft, possessing vertical takeoff and landing capabilities to be quickly and efficiently transported to an area of interest. By maximizing the cargo load carrying capacity of the hybrid VTOL while maintaining its ability to quickly be configured for flight operations, the vehicle can arrive in a forward operating area and be operational within minutes, in some instances in less than 15 minutes.

Another embodiment of a hybrid VTOL vehicle is a canard design as shown in FIGS. 8 A-D. The canard approach VTOL 800 includes a fuselage 810, canard wing 812, forward wing 814, propeller 816, and container or cargo pod 820. As with conventional model 100, the fuselage 810 of the canard approach attaches, secures, and detaches a cargo pod 820 at its undercarriage.

Figure 8A:
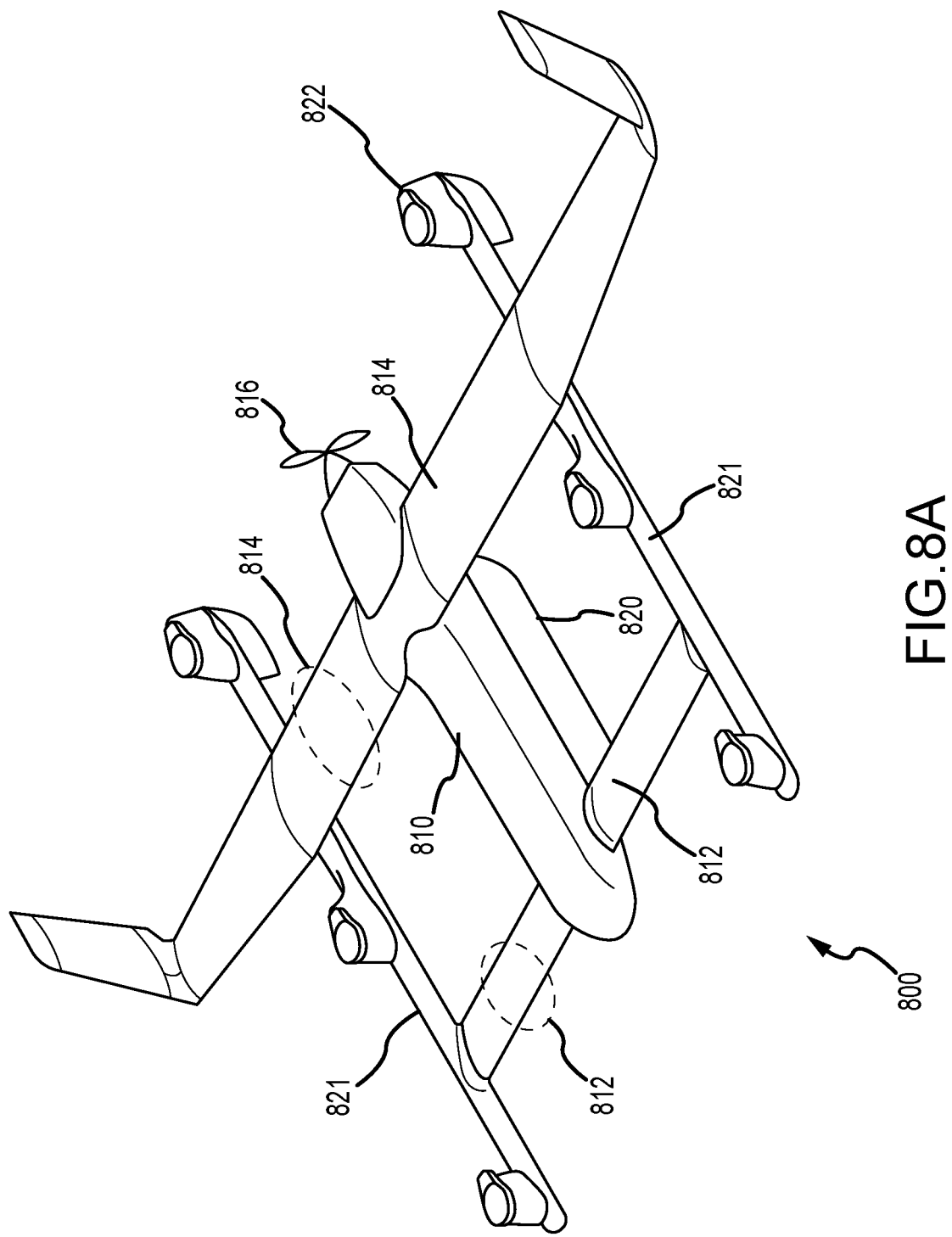
FIGS. 8A-D are perspective views of another embodiment a reconfigurable hybrid VTOL in various stages of reconfiguration transitioning from a flight configuration to a transport configuration.

As seen in FIG. 8A two booms 821 attached to both canard wing 812 and forward wing 814, on either side of fuselage 810, with three rotor assemblies 822 (in this embodiment) attached to each of the two booms 821. Each rotor assembly 822 includes a motor and a rotor. The rotor assemblies 822 enable VTOL functionality. In other embodiments, the hybrid VTOL vehicle can include a different total number of booms 821, for example, four or more. In still other embodiments, each boom 821 includes one, two, four or more, rotor assemblies 822.

To reconfigure the canard model VTOL vehicle 800 for transportation the design includes two wing tip folding mechanisms 840, and two pairs of wing-folding mechanisms 830 and 831. The folding mechanisms (not shown) are either beneath or integral with canard wing 812 and forward wing 814.

Figure 8B:
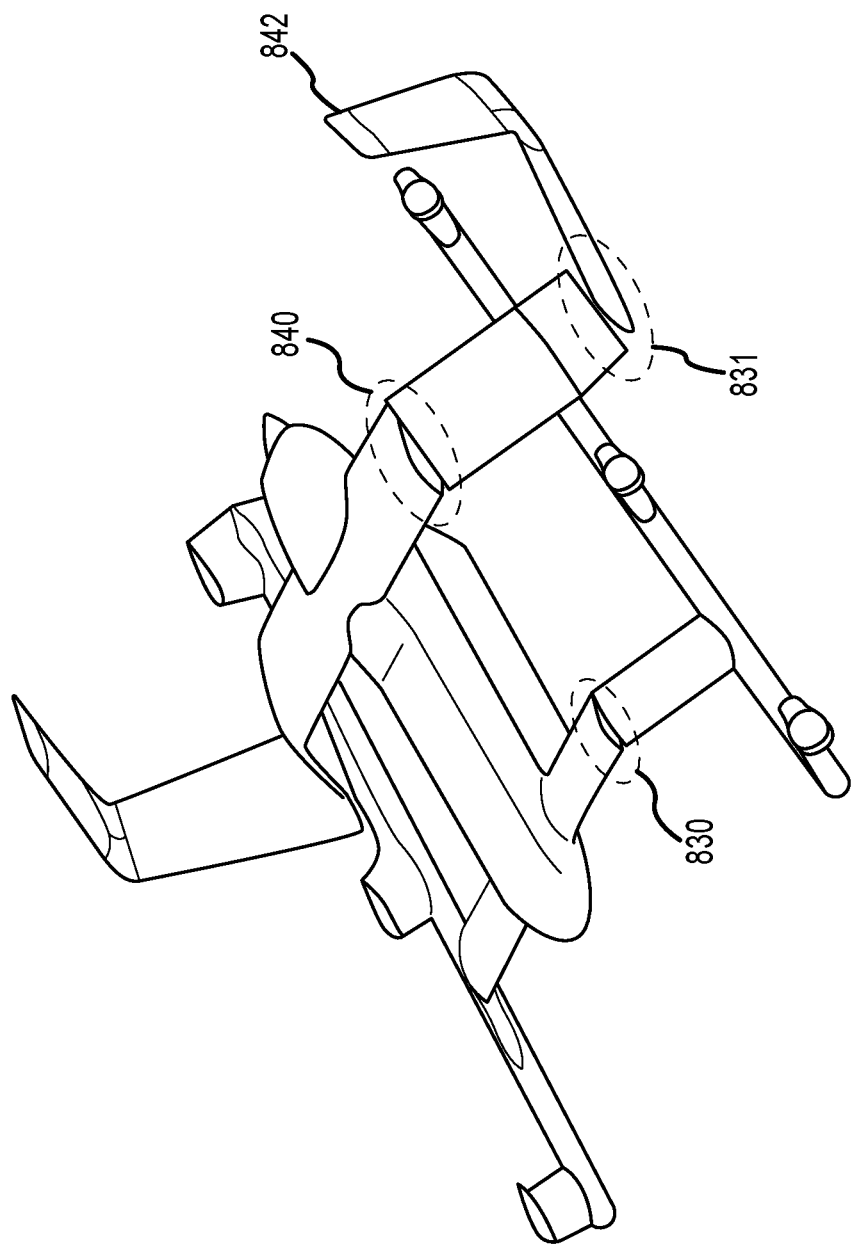
Figure 8C:
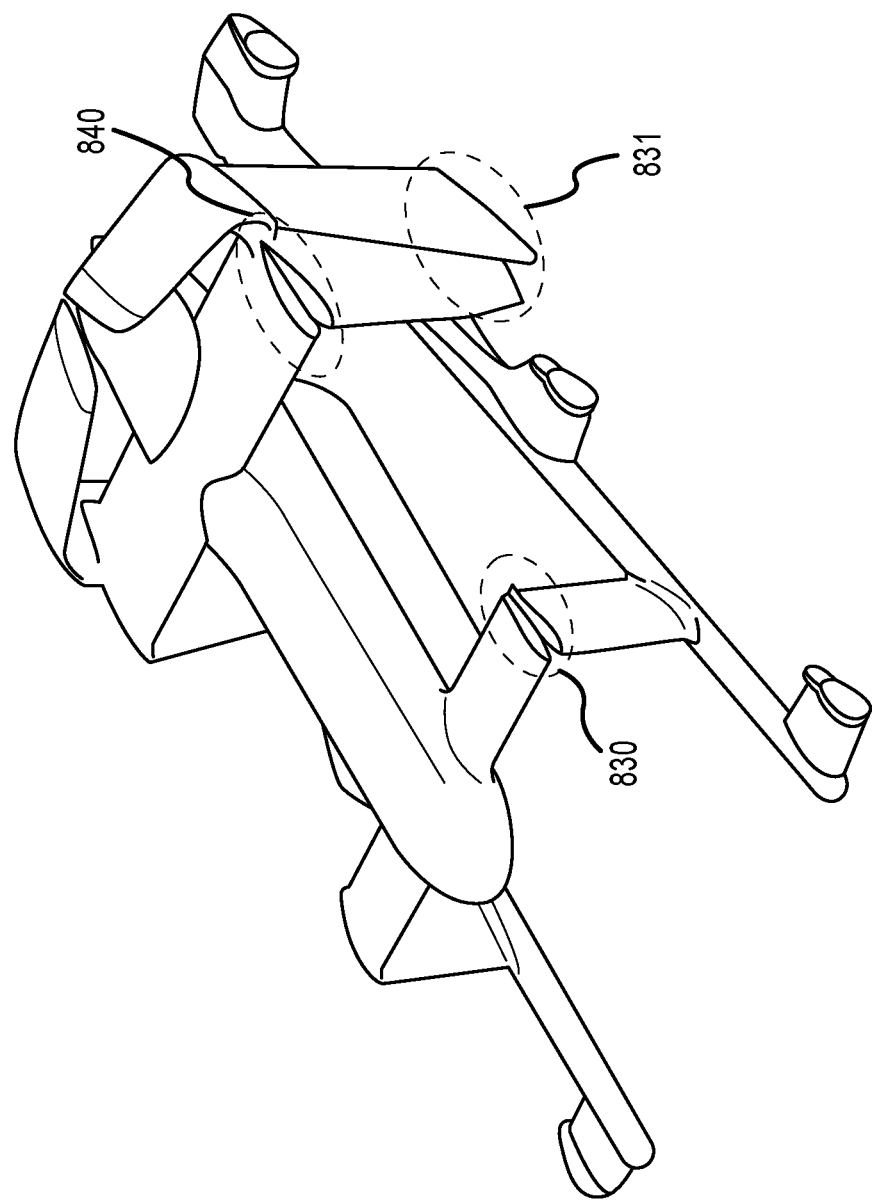
Figure 8D:
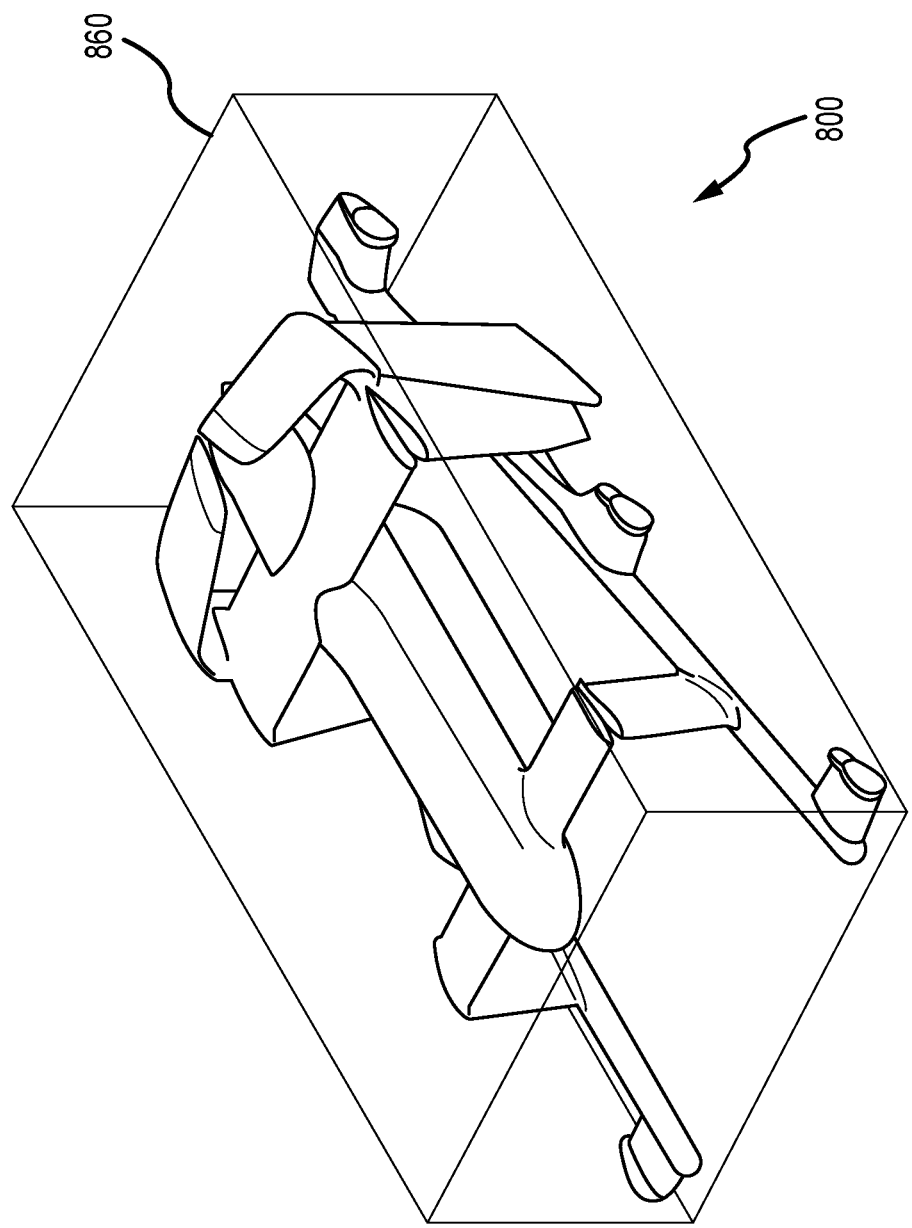

FIGS. 8B-D are illustrations of an embodiment of the canard model being folded to a transport configuration. Both wing tips 842 of the canard model VTOL vehicle 800 are folded upwards while both ends of the canard 812 and the forward wing 814, fold downward.

In a fully folded position, the angles of wing tip folding mechanisms 840 are nearly 180 degrees from their starting angles as shown in FIG. 8A, and the angles of wing folding mechanisms 830 and 831 are approximately 90 degrees from their starting angles.

FIG. 8D illustrates a canard hybrid VTOL vehicle 800 in a transport configuration stored in a rectangular or intermodal container 860. In its fully folded state, the width of the canard hybrid VTOL vehicle is cut approximately in half. Length remains the same, and height increases moderately but within the confine of a typical intermodal container 860.

A significant aspect of the present invention is the conservation of weight by maintaining a continuous and unitary wing spar. The presence of a plurality of rotor assemblies extending apart from the wing lateral axis of rotation requires the wing to be rigid. Accordingly, any folding mechanism breaking the continuity of the wing is done so at the significant expense of weight. Keeping the wing spar and thus the wing as a unitary structure, maximizes cargo carrying capacity. But doing so and meeting the need to reconfigure the vehicle for transport, necessitates rotating the wing to minimize the vehicles overhead footprint. A turntable bearing centered on the fuselage and aligned with the wing lateral axis of rotation enables the wing to pivot and align with the fuselage. And to minimize the cost of weight devoted to the turntable bearing, flight loads of the wing in a flight configuration are transferred to the fuselage through shear pins, independent of the turntable bearing. These and other considerations present the optimized reconfigurable hybrid cargo carrying VTOL of the present invention.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as is hereafter claims.

We claim:

1. A reconfigurable hybrid Vertical Takeoff and Landing (VTOL) vehicle, comprising:
 a fuselage defining a longitudinal, lateral and vertical axes wherein the fuselage includes a turntable bearing coupled to the fuselage in a horizontal plane defined by the lateral and longitudinal axes;
 a wing having a wing span with a midpoint wherein the wing includes a unitary and continuous wing spar throughout the wing span and a wing lateral axis of rotation and wherein the midpoint of the wing, centered on the wing lateral axis of rotation, is rotatably coupled with the fuselage at the turntable bearing, enabling the wing to rotate about the turntable bearing to a transport configuration;
 an empennage, wherein the empennage is configured to translate away from the fuselage along the longitudinal axis and pivot downward in a vertical plane defined by the vertical and longitudinal axes so as to deconflict with the wing in the transport configuration; and two or more rotor assemblies wherein each rotor assembly is coupled to the wing symmetrically distant from the midpoint.

2. The reconfigurable hybrid VTOL vehicle of claim 1, wherein the longitudinal axis of the fuselage bisects the turntable bearing.

3. The reconfigurable hybrid VTOL vehicle of claim 1, wherein the wing lateral axis of rotation is aft of the unitary and continuous wing spar.

4. The reconfigurable hybrid VTOL vehicle of claim 1, further comprising a plurality of shear pins attaching the wing spar to the fuselage in a flight configuration.

5. The reconfigurable hybrid VTOL vehicle of claim 4, wherein aerodynamic flight loads transfer from the wing spar to the fuselage via the shear pins and independent of the turntable bearing.

6. The reconfigurable hybrid VTOL vehicle of claim 1, wherein aerodynamic flights loads are transferred to the fuselage independent of the turntable bearing.

7. The reconfigurable hybrid VTOL vehicle of claim 1, wherein the wing is configured to prevent aeroelastic deformation caused by the two or more rotor assemblies.

8. The reconfigurable hybrid VTOL vehicle of claim 1, wherein each rotor assembly pivotally rotates toward the wing lateral axis of rotation in the transport configuration.

9. The reconfigurable hybrid VTOL vehicle of claim 1, further comprising one or more sources of horizontal thrust coupled to the wing.

10. The reconfigurable hybrid VTOL vehicle of claim 1, wherein the fuselage includes a central control module configured to control thrust of each rotor assembly.

11. The reconfigurable hybrid VTOL vehicle of claim 10, further comprising a central wiring bus extending through the turntable bearing electrically coupling each of the rotor assemblies to the central control module.

12. The reconfigurable hybrid VTOL vehicle of claim 1, wherein the reconfigurable hybrid VTOL vehicle in the transport configuration fits within interior dimensions of a 40-foot ISO 6346 intermodal container.

13. The reconfigurable hybrid VTOL vehicle of claim 12, wherein exterior dimensions of the reconfigurable hybrid VTOL vehicle in the transport configuration are less than or equal to 7 feet 6 inches wide, 7 feet 6 inches high, and 39 feet 0 inches long.

14. A hybrid Vertical Takeoff and Landing (VTOL) vehicle reconfiguration apparatus, comprising:
a turntable bearing coupled to a fuselage wherein the fuselage defines a longitudinal, lateral and vertical axes and wherein the turntable bearing rotates in a horizontal plane defined by the lateral and longitudinal axes;
a wing having a wing span and a lateral axis of rotation through which a wing center of mass resides and wherein the wing span includes a midpoint centered on the wing lateral axis of rotation, the midpoint being rotatably coupled with the turntable bearing, enabling the wing to rotate about the turntable bearing to a transport configuration;
an empennage, wherein the empennage is configured to translate away from the fuselage along the longitudinal axis and pivot downward in a vertical plane defined by the vertical and longitudinal axes so as to deconflict with the wing in the transport configuration; and
two or more rotor assemblies wherein each rotor assembly is coupled to the wing symmetrically distant from the midpoint and symmetrically apart from the wing lateral axis of rotation.

15. The hybrid VTOL vehicle reconfiguration apparatus of claim 14, wherein the wing includes a unitary and continuous wing spar throughout the wingspan and wherein the wing spar is coupled to the fuselage in a flight configuration independent of the turntable bearing and wherein aerodynamic loads are transferred from the wing spar to the fuselage independent of the turntable bearing.

16. The hybrid VTOL vehicle reconfiguration apparatus of claim 15, further comprising a plurality of shear pins configured to couple the wing spar to the fuselage independent of the turntable bearing in a flight configuration.

17. The hybrid VTOL vehicle reconfiguration apparatus of claim 14, and wherein one or more rotor assembly pivots toward the wing lateral axis of rotation in the transport configuration.

18. The hybrid VTOL vehicle reconfiguration apparatus of claim 17, and wherein one or more rotor assembly remains in a flight configuration with respect to the wing while the wing is in the transport configuration.

19. The hybrid VTOL vehicle reconfiguration apparatus of claim 18, wherein the empennage is configured to deconflict with the one or more rotors that remain in a flight configuration with respect to the wing in the transport configuration.

20. The hybrid VTOL vehicle reconfiguration apparatus of claim 14, wherein the wing is configured to prevent aeroelastic deformation caused by the two or more rotor assemblies in a flight configuration.

21. The hybrid VTOL vehicle reconfiguration apparatus of claim 14 wherein the hybrid VTOL in the transport configuration fits within interior dimensions of a 40-foot ISO 6346 intermodal container.

22. The hybrid VTOL vehicle reconfiguration apparatus of claim 21, wherein exterior dimensions of the hybrid VTOL in the transport configuration are less than or equal to 7 feet 6 inches wide, 7 feet 6 inches high, and 39 feet 0 inches long.

* * * * *